United States Patent Office 3,167,655
Patented Jan. 26, 1965

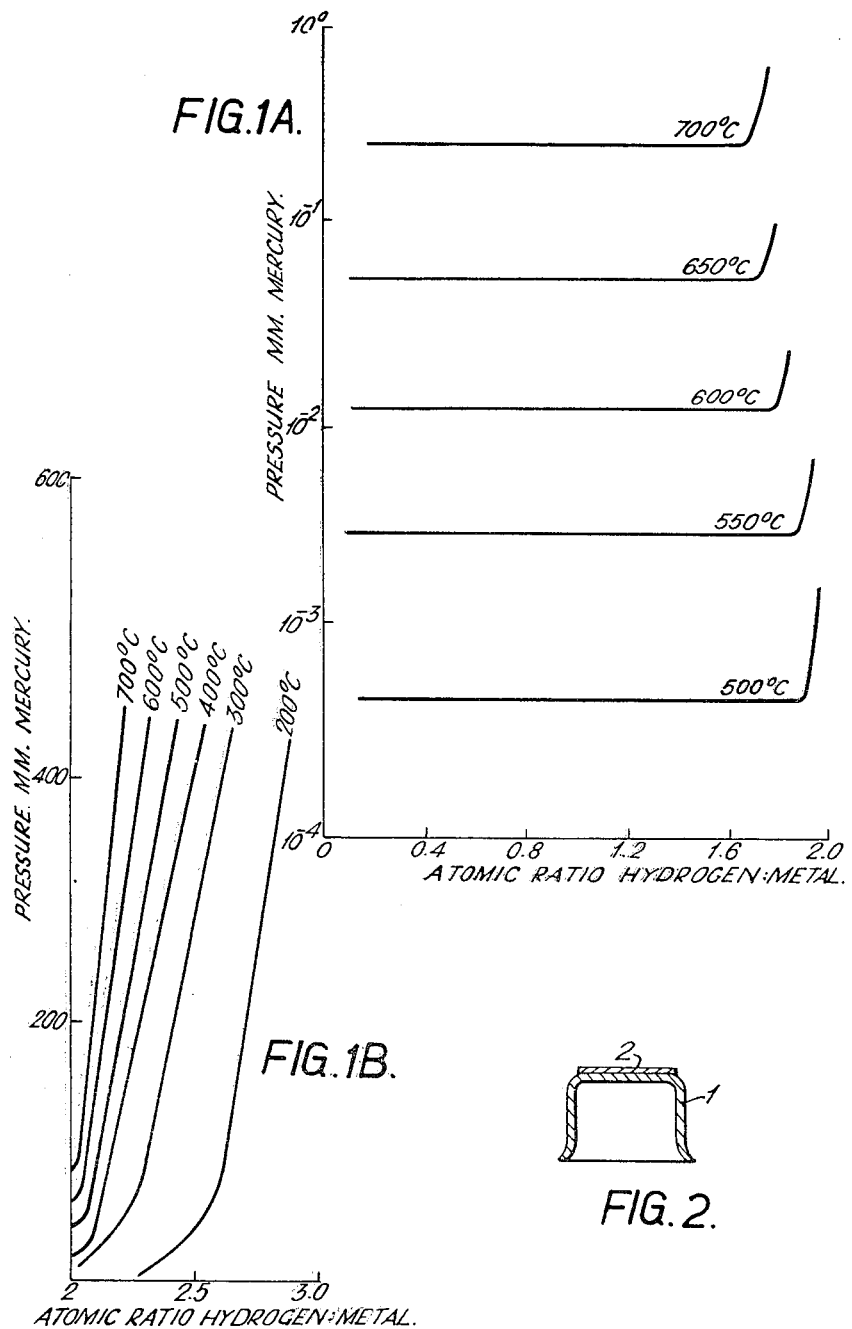
FIG.1A.
FIG.1B.
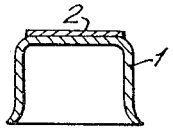
FIG.2.

3,167,655
TARGET FOR A NEUTRON GENERATOR CONSISTING OF A COATING OF ONE OF THE LANTHANON ELEMENTS ON A BASE METAL
Reuben Redstone, Baldock, and Michael Charles Rowland, Hitchin, England, assignors, by mesne assignments, to the United States of America as represented by the United States Atomic Energy Commission
Filed Aug. 25, 1961, Ser. No. 136,135
1 Claim. (Cl. 250—84.5)

This invention relates to apparatus for generating neutrons by bombarding a target containing a hydrogen isotope with an energetic beam of ions of hydrogen isotope.

In the generation of neutrons by means other than isotopic sources, the following two nuclear reactions have been used in preference to others. One reaction $T(d,n)He^4$ has a slightly lower energy requirement than the other recation $D(d,n)He^3$ and has therefore been used rather more widely. In carrying out these reactions tritium or deuterium ions in a beam are accelerated by any suitable means to voltages of the order of 100–200 kv. or above and the beam is trained on a target containing deuterium or tritium as the case may be. Any type of accelerator may be used. Suitable accelerators include the Cockroft-Walton type of generator, travelling wave accelerators, linear high voltage accelerators using magnetic or eletrostatic fields or accelerators of the cyclotron type.

The target must of course be mounted in a vacuum system and during assembly operations and during bombardment may become hot. Targets which have been used are composed of a film of titanium or zirconium impregnated with deuterium or tritium and deposited on a base of nickel, silver, copper or platinum. Such targets have been found to be reliably stable up to about 230° C.

The output of neutrons from the target is limited by many factors, important among which is the highest temperature at which the target is stable. If the stability temperature could be raised, the beam current could be increased and a greater neutron output obtained.

The production or assembly of neutron generators is influenced in a somewhat undesirable manner by the nature of the targets which have up to now been available. Up to now it has been necessary in the great majority of cases to mount the target in position in the apparatus before impregnating with deuterium or tritium. Thus for example in the production of sealed neutron-generator tubes it has been found necessary to mount the target and to complete all glass blowing operations, with the exception of a single open side arm remote from the target, before the impregnation stage can be carried out. Such methods of construction are wasteful in that if the target fails the inspection tests for impregnation quality, the whole tube must be scrapped.

An object of this invention is to provide an improved target which can withstand high bombardment temperatures and which can be made and inspected before being mounted in the neutron generator.

The invention consists in a neutron generator of the type in which a beam of energetic ions of hydrogen isotope bombards a target composed of metal impregnated with hydrogen isotope, wherein the said metal is chosen from the group consisting of yttrium and the lanthanons.

The lanthanons are the fourteen elements in Group IIIA of the Periodic Table with atomic numbers from 57 to 71. Yttrium is also in Group IIIA and is commonly classed with the lanthanons when considering its chemical properties. In the present case it behaves as a lanthanon, its hydride having dissociation pressure curves similar to those of the lanthanons. Of the lanthanons, ytterbium has a rather low melting point of 824° C. and care should be taken not to expose it to too high a temperature. Elements in the atomic number range 64 to 71 or yttrium, are preferred since targets based on these elements tend to be more stable to atmospheric oxidation than 57 to 63 and can also be used at higher temperatures. We have measured the temperature at which the outgassing rate into a vacuum of yttrium and lanthanon hydrides impregnated to an atomic ratio of 1.7 was rapid. The temperatures observed were:

| | ° C. |
|---|---|
| Yttrium hydride | 650 |
| Neodymium hydride | 650 |
| Praseodymium hydride | 640 |
| Gadolinium hydride | 690 |
| Erbium hydride | 690 |
| Lutecium hydride | 720 |

Metals referred to alloy with many of the metals which may be used as substrate.

It is preferred to use the metal supported on a substrate comprising molybdenum or tungsten. The substrate may be composed of other metals e.g. nickel or copper coated with one of the above-named metals which does not alloy readily with the lanthanons or yttrium.

The invention will now be illustrated by way of example with reference to neodymium with molybdenum as substrate. In the drawings accompanying the complete specification.

FIGURES 1A and 1B show isothermal curves of the dissociation pressure as a function of composition and FIGURE 2 is a sectional diagram not to scale of a target.

FIGURES 1A and 1B show the broad plateau which is displayed by yttrium and the lanthanons. In the case of neodymium the plateau extends up to an atomic ratio of about 2:1. As more hydrogen is added it is accommodated in less favourable sites in the lattice and this leads to a sharp increase in dissociation pressure. For high temperature target operation the atomic ratio should be limited to not more than 1.8:1.

In FIGURE 2 a molybdenum cup 1 prepared by drawing acts as a supporting substrate for a thin film 2 of neodymium.

The method used to prepare the target is as follows:

The cup is cleaned first by an electrolytic deplating process. This removes the surface layer of metal which often becomes contaminated during handling and pressing operations, and imparts a high polish to the target surface which is advantageous in high voltage devices. The cup is degreased, washed in distilled water and furnaced at 900° C. in a wet hydrogen atmosphere then at 900° C. in dry hydrogen to remove gas and surface carbon which may be present in the molybdenum, and then weighed.

The cup is supported on a framework which has facilities for heating the target face. A mask is fitted close to the cup to limit the area on to which neodymium is deposited.

A 2 mm. tungsten rod acts as a support for 1 mm. neodymium wire wound in a coarse helix and then bound on with a fine pitch helix of 0.1 mm. tungsten wire.

The evaporation is performed in a conventional high vacuum bell jar apparatus. A pressure of less than $5 \times 10^{-5}$ mm. Hg is initially required. The substrate cup is outgassed by heating to 850° C. for 30 minutes by which time the pressure falls to about $2 \times 10^{-5}$ mm. Hg, and maintained at this temperature by a local heater until the evaporation has started.

The evaporation rod is first outgassed by heating to just below the melting point of neodymium (1,024° C.) for 10 minutes. Prior to the evaporation a measured quantity of hydrogen isotope is isolated in a separate part of the apparatus ready for immediate admission to the bell jar. The rod is raised to a temperature (>2,000° C.) above the melting point of neodymium sufficient to evaporate the full charge of neodymium within one minute. Simultaneous with this the substrate heater is switched off. Although the neodymium melts it is contained by the fine tungsten helix and evaporation occurs in a controllable manner. The thickness of the deposited layer should be about 1.25 mg./cm.$^2$ for use with ion beams of about 100 kv. For higher energies thicker films would be used, up to about 2 mg./cm.$^2$.

Immediately the evaporation is complete the bell jar volume is isolated from the pump and pure hydrogen isotope is admitted. Sufficient hydrogen isotope is admitted to saturate all the neodymium and to leave an excess pressure of about 3 mm. in the bell jar. The target is left in the excess hydrogen isotope for several hours to ensure that saturation is complete. A minimum time of 30 minutes can however be used if desired.

Measurements have shown that saturated targets have atomic ratios of hydrogen to neodymium of at least 2.7 to 1. If desired one can bake the target under vacuum to bring the ratio down to not more than 1.8:1.

The hydrogen isotope is conveniently stored in pyrophoric uranium enclosed in a stainless steel container and is generated by heating the container. This provides a very pure source of hydrogen isotopes which minimises contamination to the evaporated film.

The target is removed from the evaporation apparatus and reweighed and hence the total weight of neodymium and hydrogen isotope deposited is determined.

During impregnation of the neodymium with hydrogen isotope structural changes occur which are accompanied by dimensional changes. Consequently adherence of the neodymium film to the molybdenum must be sufficient to prevent flaking during impregnation. Adequate bonding is obtained if the neodymium is deposited on a hot substrate and this is preferred in practice.

Rapid evaporation is known to produce denser, smaller grained deposits. It has been found that such films absorb hydrogen less rapidly than slowly evaporated films and that they are less liable to flake. It is not known if this resistance to flaking is inherent in the denser films or is due to the lower rate of dimensional change resulting from the lower hydrogen absorption rate.

Blue oxide rapidly forms on the surfaces of pure neodymium films exposed to air. Under moist conditions the films turn red-brown and flake off the substrates. Hydrided films oxidise much more slowly and consequently only simple precautions are necessary for the safe handling of impregnated neodymium targets. The target can undergo conventional tube assembly techniques such as spot welding onto glass pinches and brazing into metal-glass assemblies with no apparent deterioration. Although the targets are stable it is preferable to prevent long exposure to air.

In thermal stability investigations, targets of known deuterium content have been maintained at 450° C. for 7 to 9 hours on a high vacuum pump. After this treatment they have been heated to 650 to 800° C. to evolve the deuterium and hence to determine the gas content. It has been found that targets of composition $NdD_{2.7}$ lose gas during the heating at 450° C. until the "plateau" composition $NdD_{1.7}$ remains. These targets and those which have been initially impregnated to the composition $NdD_{1.7}$ lose no measurable quantity of gas under similar test conditions at 450° C.

Similar experiments performed with two neodymium targets maintained at 500° C., 550° C. and 600° C. for one hour have also shown very little (<5%) loss of gas. However a target heated to 650° C. for 1 hour lost almost all its hydrogen. Lutecium was stable to 600° C. but lost hydrogen at 650° C. Erbium was slightly more stable, losing one third at 650°, and most at 700° C.

Thus neodymium hydride targets may be heated to at least 450° C. without loss of hydrogen, to 600° C. with little loss but heating at 650° C. is excessive. These temperatures depend on secondary surface and diffusion rate effects and the pumping speed from the vicinity of the target.

The specific neutron yield of tritium impregnated neodymium targets has been measured under deuteron bombardment at energies of 44 kev. and 204 kev. in a Cockroft-Walton accelerator. Values of $2.5 \times 10^6$ and $1.3 \times 10^8$ neutrons per microcoulomb were obtained at 44 kev. and 204 kev. respectively for a saturated target ($NdT_{2.7}$) and proportionately lower for one of composition ($NdT_{1.7}$).

We claim:

A target for a neutron generator of the type in which a beam of energetic ions of hydrogen isotope bombards a target comprising a thin film of metal impregnated with hydrogen isotope, said thin film of metal being supported on a metallic substrate consisting of a metal chosen from the group consisting of molybdenum, tungsten, chromium and manganese, and said thin film of metal having a thickness in the range of about 1 to about 2 mg./cm.$^2$ and said thin film of metal being selected from the group consisting of yttrium and the lanthanons having an atomic number from 57 through 71, the atomic ratio of hydrogen isotope to impregnated metal being not above 1.8:1, and said target being capable of operating at an optimum efficiency at a temperature of at least about 600° C.

References Cited by the Examiner
UNITED STATES PATENTS

| | | | |
|---|---|---|---|
| 2,847,331 | 8/58 | Ashley | 250—84.5 |
| 2,957,096 | 10/60 | Bernander et al. | 250—84.5 X |
| 2,967,245 | 1/61 | Soloway | 313—61 |

OTHER REFERENCES

Chemistry of the Hydrides by Hurd, The Wiley Press, 1952, page 177.

Mikheeva et al.: Russian Chemical Reviews (Uspekhi Khimii), vol. 29, pp. 28–37 incl., translation published by The Chemical Society, London, 1960.

Olesen et al.: Nuclear Physics, vol. 15, No. 1, February 1960, pp. 134 to 142 incl.

Elbek et al.: Physical Review, vol. 108, No. 2, Oct. 15, 1957, pp. 406 to 410 incl.

RALPH G. NILSON, *Primary Examiner.*

MAYNARD R. WILBUR, JAMES W. LAWRENCE, *Examiners.*